United States Patent Office 3,544,347
Patented Dec. 1, 1970

3,544,347
PROCESS FOR THE PRODUCTION OF ZIRCONIUM-VANADIUM BLUE PIGMENTS
Horst Weber, Leverkusen, Germany, assignor to Farbenfabriken Bayer Aktiengesellschaft, Leverkusen, Germany, a corporation of Germany
No Drawing. Filed Jan. 11, 1967, Ser. No. 608,484
Claims priority, application Germany, Jan. 18, 1966,
F 48,194
Int. Cl. C09c 1/00
U.S. Cl. 106—299                                    4 Claims

ABSTRACT OF THE DISCLOSURE

Process for the production of zirconium-vanadium blue pigments wherein a zirconium silicate-alkali mixture is decomposed at a temperature above 800° C., to the decomposed zirconium silicate is then added water to form a slurry, which is rapidly mixed with an inorganic acid. The resulting mixture to which previously had been added oxides of vanadium is then calcined at a temperature of 850° to 1150° C.

FIELD OF THE INVENTION

The present invention relates to a process for the production of zirconium-vanadium blue pigments from zirconium silicates. Zirconium-vanadium blue pigments are valuable pigments of high tinting strength and stability, for example, in the ceramic and enamel industries.

DESCRIPTION OF THE PRIOR ART

German patent specification No. 849,074 discloses a process for the production of zirconium silicate blue pigments in which mixtures of zirconium dioxide with silicon dioxide, vanadium pentoxide and, optionally, mineralizers are calcined at temperatures in the range of from 550° C. to 1300° C. In general, these pigments contain from 60% to 70% by weight of $ZrO_2$, approximately 30% by weight of $SiO_2$ and from 3% to 5% by weight of $V_2O_5$. The zirconium oxide ($ZrO_2$) used in this known process is obtained from the naturally occurring zirconium mineral $ZrSiO_4$ by thermal or chemical decomposition. For the chemical decomposition, the ground $ZrSiO_4$ material is mixed with an alkali metal compound, the resulting mixture is calcined to form an acid-decomposable product generally known as an alkali zirconium silicate, the zirconium is dissolved out with hydrochloric acid in the form of $ZrOCl_2$ and filtered, the $ZrOCl_2$ is converted by the addition of sulphuric acid into difficultly soluble $ZrOSO_4$, and the precipitate is washed out and converted with ammonia, or thermally, into $ZrO_2$. Processes comprising the above mentioned steps are described with modifications and elaboration of particular conditions in a number of patent specifications, including French patent specification No. 1,375,076 and German Auslegeschrift No. 1,209,932. Since the suspensions are extremely difficult to filter on account of gel-like constituents contained therein, washing out and filtration are complicated and time-consuming processes. For this reason, various attempts at simplification have been made and processes have been developed which comprise only one filtration stage. For example, Italian patent specification No. 668,402 describes, although not in detail, a process in which the alkali zirconium silicate is treated with mineral acids until it is neutral, washed out and dried. By the neutralization with sulphuric acid, for example, the alkali zirconium silicate is converted into a mixture of sodium sulphate, optionally together with zirconium sulphate, and oxides of zirconium and silicon in amorphous and coloidal form. Washing out is intended to remove the sodium sulphate although this is difficult on account of the finely-divided condition of the oxidic compounds. In order to improve filterability, it is proposed in U.S. patent specification No. 2,871,138 to dehydrate the mass following acid treatment by heating it to temperatures in the range of from 750° C. to 1000° C. Unfortunately, dehydration represents an additional stage which, according to German patent specification No. 1,168,316, is compensated by mixing the alkali zirconium silicate with a solid ammonium salt of the acid, rather than treating it with the acid itself, and carrying out neutralization with this compound during heating. The resulting alkali salt is then washed out. All the washed products obtained by these processes are mixed with a vanadium compound and optionally with silicon monoxide and mineralisers, and the resulting mixture is calcined to form the pigment. The calcined product is then ground, washed and dried in the usual way.

SUMMARY OF THE INVENTION

It is an object of the present invention to provide a highly economic process for the production of zirconium-vanadium blue pigments. It is an object of the present invention to provide a process for the production of zirconium-vanadium blue pigments directly from readily available zirconium silicates, without separating off the silica and other constituents.

It is still another object of the present invention to provide a process for the production of zirconium-vanadium blue pigment which can be carried out continuously.

Other objects of the present invention are described in the following description.

It has now been found in accordance with the present invention a process for the production of zirconium-vanadium blue pigments by calcining mixtures containing zirconium, silicon and vanadium, optionally in the presence of mineralizers, which, when compared with conventional processes, does not involve the difficult step of filtration before the pigment-forming calcination stage, and which can be carried out more simply and more economically in a few component operations. In the process according to the invention, the zirconium silicate is decomposed with alkalis in a molar ratio of alkali metal: zirconium silicate greater than 1, by heating to temperatures above 800° C., the decomposed product is mixed with water in a molar ratio of water: zirconium silicate greater than 5:1 and the resulting suspension is mixed as quickly as possible with an inorganic acid, preferably sulphuric acid, in a quantity of more than 0.5 gram-equivalent of acid to gram-atom of alkali, oxides of vanadium or compounds which form them being added during dium or components which form them being added during, or following, the addition of the acid in quantities of from 0.01 mol to 0.10 mol, fased on $V_2O_5$, per mol of $ZrSiO_4$, and the resulting mixture is calcined after dehydration at temperatures in the range of from about 850° C. to 1150° C. and, optionally, ground, washed and dried in the usual way.

It is surprising that zirconium-vanadium blue pigments of high tinting strength, purity and stability are formed by this process from naturally occurring zirconium silicate under the special conditions referred to, without there being any need to separate the reaction salts or the silica. According to previous literature which, for high-grade products, recommends a zirconium oxide which is particularly pure and, in any case, free from reaction salts for the pigment-forming calcination stage, this was in no way to be expected.

DESCRIPTION OF THE PREFERRED EMBODIMENTS

The process according to the invention can be carried out very simply in the conventional apparatus normally used for the production of pigments.

The zirconium silicate is heated after grinding, whereby the grain size of the starting product is of minor importance, to temperatures in the range of from 800° C. to 1200° C., preferably in the range of from 950° C. to 1100° C., in the presence of alkalis. Although sodium carbonate is preferably used as the alkali, sodium hydroxide, potassium hydroxide, potassium carbonate, lithium carbonate, and the like may also be used. More than approximately 1 mol of alkali, expressed as metal, and preferably 1 to 4 mols of alkali are used per mol of $ZrSiO_4$, particularly good results are obtained with 1.5 to 3 mols of alkali. It is not advisable to use a large excess of alkali if the material to be decomposed is to be prevented from caking or from being sintered. Under the conditions specified, a powdery decomposed product is obtained which can be further processed without difficulty. Decomposition usually takes between 30 minutes and 2 hours, although this period is governed both by the process conditions and the quantities of material involved.

The decomposed product is suspended by introduction into water, for which purpose more than 5 mols of water are used per mol of zirconium silicate. It is preferred to use a molar ratio of zirconium silicate to water of between 1:5 and 1:20. Although a large excess of water is not harmful, it is not advisable from a technical point of view because the water has to be removed again in the following process. Normally, the quantity of water used will be just sufficient to produce a flowable or pumpable suspension. A mineral acid is then added to the suspension. The conventional commercially used mineral acids may be applied. Particularly good results are obtained with sulphuric acid. A least 0.5 and preferably 0.8 to 1.5, acid equivalents should be added, based on alkali.

When the acid is added thereto, the initially free-flowing mixture stiffens up until finally it is completely solid. In order to obtain optimum properties, the acid must be homogeneously intermixed. It has proved to be of advantage to intermix the acid in an extremely small mixing vessel which is filled or charged with the appropriate quantities by running the components into it either continuously or in batches, and which enables the components to be mixed in the shortest possible time, less than 5 minutes and preferably in seconds, accompanied by high turbulence.

The vanadium compounds are added during preparation of the suspension before or after the acid is added to it. Vanadium pentoxide or ammonium vanadate is preferably used, although any other oxide of vanadium or, under the conditions of the process, oxide-forming vanadium compounds such as, for example, vanadium oxychloride, vanadium oxyfluoride, vanadium trichloride, and the like may also be used. The vanadium compounds may be added in powdery form and even in aqueous suspension or solution.

The resulting mixture is then calcined at temperatures in the range of from 850° C. to 1150° C., preferably after the water has been removed by initial drying. Calcination can be carried out in the units normally used for the production of ceramic pigments, for example, in chamber-, tunnel-, muffle- or rotary furnaces. Initial drying can be carried out in shelf dryers, drying chambers, rotary dryers and, optionally, even in spray dryers. Initial drying and calcination can even be carried out in one stage. During calcination, the initially dried or pre-dried product is kept for at least some 30 minutes at a temperature in the range of from 850° C. to approximately 1150° C. in order to obtain a pigment with the required properties. The atmosphere under which calcination is carried out does not have to meet any special requirements. For this reason, there is no need to prevent oxygen from reaching the product to be calcined by means of screens or covers.

Optimum tinting strengths of the products are obtained at a calcination temperature in the range of from approximately 950° C. to approximately 1100° C. It is possible by adding mineralizers, particularly fluorides such as, for example, sodium fluoride, potassium fluoride, zirconium oxyfluoride, and the like, to lower the optimum temperature range for calcination by about 50° C. However, mineralizers do not necessarily have to be added.

The calcined product is preferably ground and desalted in the usual way.

The process according to the invention is illustrated by the following examples.

Example 1

183 g. of zirconium silicate ($ZrSiO_4$) are mixed with 186 g. of sodium carbonate ($Na_2CO_3$), corresponding to a ratio of 3.5 gram-atoms of Na per mol of $ZrSiO_4$, and are calcined for one hour at 1,050° C. in an open capsule in an electrically heated funrace. The calcine is mixed with 210 ml. of water, 9.4 g. of ammonium-vanadate ($NH_4VO_3$) and 10.5 g. of sodium fluoride (NaF) in a ball mill and mixed while stirring in a beaker with 222 g. of 96% sulphuric acid. The quantities correspond to the ratios of 11.7 mols of $H_2O$; 0.04 mol of $V_2O_5$ and 0.25 mol of F per mol of $ZrSiO_4$ and 1.25 gram-equivalents of $H_2SO_4$ per gram-atom of Na in the $Na_2CO_3$. The mass which his initially free flowing, solidfying about 2 minutes after the sulphuric acid has been added, is dried, calcined for one hour at 1000° C., ground while still wet, washed and dried. The product has a rich blue color both in its powder form and after it has been embedded in a ceramic or enamel composition.

Example 2

The procedure is as in Example 1, except that no NaF is added, whilst calcination is carried out at 1050° C. instead of at 1000° C. The powder is somewhat greener in color than the product in Example 1, although it produces the same color in a ceramic or enamel composition.

Example 3

183 g. of zirconium silicate ($ZrSiO_4$) are mixed in a barrel mixer with 106 kg. of sodium carbonate ($Na_2CO_3$), corresponding to a ratio of 2 gram-atoms of alkali Na per mol of $ZrSiO_4$, and are calcined for 3 hours at 1000° C., in a gas-fired rotary furnace. The loosely formed calcine is mixed and homogenized with 250 litres of water, 9.4 kg. of ammonium vanadate ($NH_4VO_3$) and 10.5 kg. of NaF, in a vessel equipped with an intensive stirror. This mixture and 127 kg. of 96% sulphuric acid are fed continuously via a metering pump, delivering the mixture at a rate of 2000 kg./hour and a feed rate adjusted to 270 litres/hour of 96% sulphuric acid. into a narrowly enclosed intensive mixer which has an opening for this feed above the stirror unit, an outlet slot in its side and an effective capacity of approximately 2 litres, ensuring a residence time of approximately 1 second. The quantities added correspond to the ratios of 13.9 mols of $H_2O$; 0.04 mol of $V_2O_5$ and 0.25 mol of F per mol of $ZrSiO_4$ and 1.25 gram-equivalents of $H_2SO_4$ per gram-atom of Na in the $Na_2CO_3$. The mixture issuing from the slot which, initially, is still free-flowing is delivered to a rotary furnace in which it solidifies into crumbs within approximately 2 minutes of leaving the slot in the mixer. Mixing and charging of the furnace take about 15 minutes to complete. The gas burner of the furnace is then lighted, and the crumbs dried and heated for 3 hours to 1000° C. The furnace is emptied, the product of calcination is introduced into a ball mill together with approximately 200 litres of water, and soluble salts are removed therefrom by washing. Finally, the pigment formed in a quantity of approximately 185 kg. is dried. The product has a deep blue color both in powder form and after it has been embedded in a ceramic or enamel composition.

I claim:
1. A process for the production of zirconium-vanadium blue pigment which consists essentially of heating a zirconium silicate-alkali mixture, said alkali being a member selected from the group consisting of sodium hydroxide, potassium hydroxide, sodium carbonate, potassium carbonate and lithium carbonate, having a molar ratio of alkali metal to zirconium of between about 1:1 and 4:1 to a temperature of between 800 and 1200° C. thereby decomposing said zirconium silicate, mixing the decomposed product with water in a molar ratio of water to zirconium silicate of between 1 to 5 and 1 to 20, thereby forming an aqueous suspension, mixing said suspension
    (a) with sulfuric acid in a ratio of between 0.5 and 1.5 g. equivalents of acid per gram-atom of alkali in a time of less than 5 minutes, and
    (b) with a vanadium compound selected from the group consisting of vanadium oxides, compounds of vanadium forming oxides and mixtures thereof in an amount of from 0.01 to 0.10 mol, based on $V_2O_3$ per mol of $ZrSiO_4$ and calcining the resulting mixture to a temperature of between about 850 and 1150° C., thereby obtaining zirconium-vanadium blue pigment.

2. A process according to claim 1, wherein the molar ratio of alkali metal to zirconium is between 1.5 to 1 and 3 to 1, said silicate-alkali mixture is heated to a temperature of between 950 and 1100° C., the decomposed product is mixed with water in a molar ratio of water to zirconium-silicate, of between 1 to 5 and 1 to 20 and the aqueous suspension is mixed with sulfuric acid in a ratio of between 0.8 and 1.5 g. equivalents of acid per gram-atom of alkali.

3. A process according to claim 1, wherein to the aqueous suspension there is added additionally a mineralizer.

4. A process according to claim 3, wherein the mineralizer is selected from the group consisting of sodium fluoride, potassium fluoride, zirconium oxyfluoride and mixtures thereof.

References Cited

UNITED STATES PATENTS

| | | | |
|---|---|---|---|
| 1,261,948 | 4/1918 | Loveman | 106—299 |
| 1,454,564 | 5/1923 | Ruff | 106—299 |
| 2,441,447 | 5/1948 | Seabright | 106—299 |
| 2,871,138 | 1/1959 | Linnell | 106—299 |
| 3,025,178 | 3/1962 | Seabright | 106—299 |
| 2,273,872 | 2/1942 | Kinzie | 106—299 |

FOREIGN PATENTS

| | | | |
|---|---|---|---|
| 668,402 | 10/1964 | Italy. | |
| 1,430,485 | 1/1966 | France | 106—299 |

TOBIAS E. LEVOW, Primary Examiner

H. M. S. SNEED, Assistant Examiner